No. 842,720. PATENTED JAN. 29, 1907.
A. R. STEPHENS.
KITCHEN CABINET.
APPLICATION FILED JULY 2, 1906.
3 SHEETS—SHEET 1.
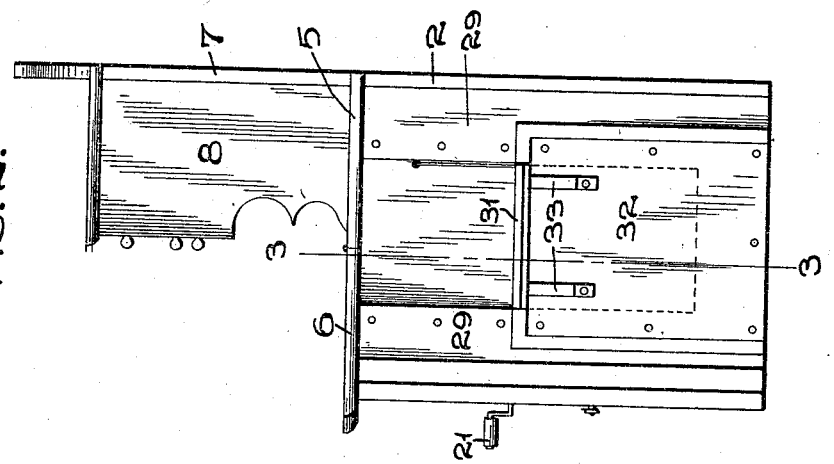
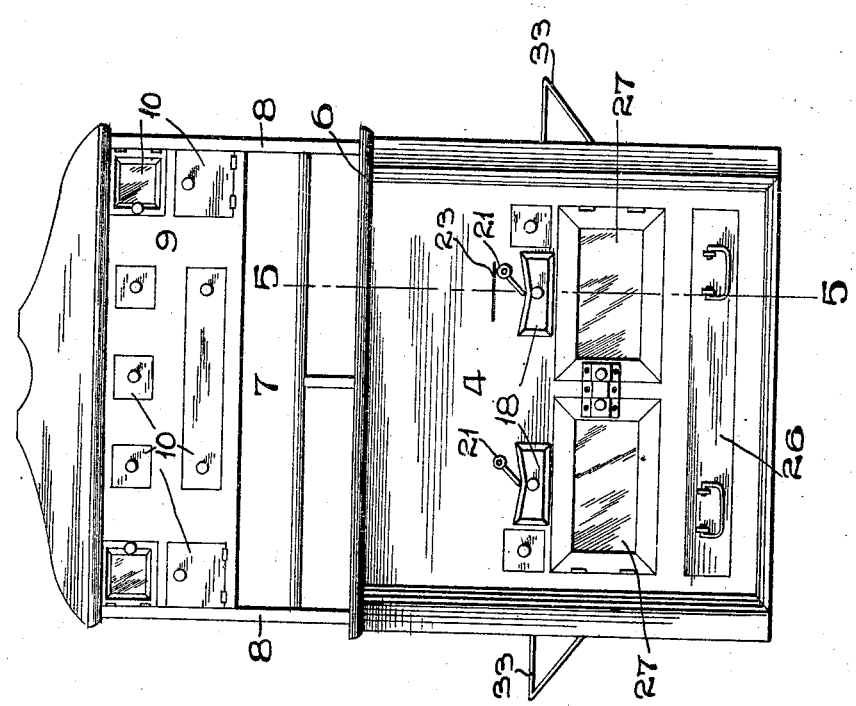
ATTEST.
INVENTOR.
ALEXANDER R. STEPHENS
BY
ATT'YS No. 842,720. PATENTED JAN. 29, 1907.
A. R. STEPHENS.
KITCHEN CABINET.
APPLICATION FILED JULY 2, 1906.
3 SHEETS—SHEET 2.
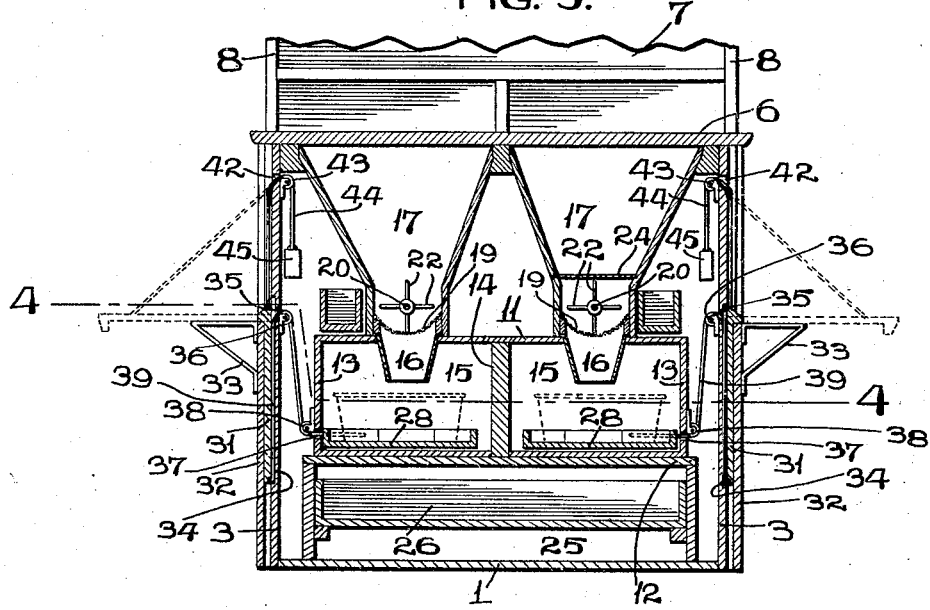
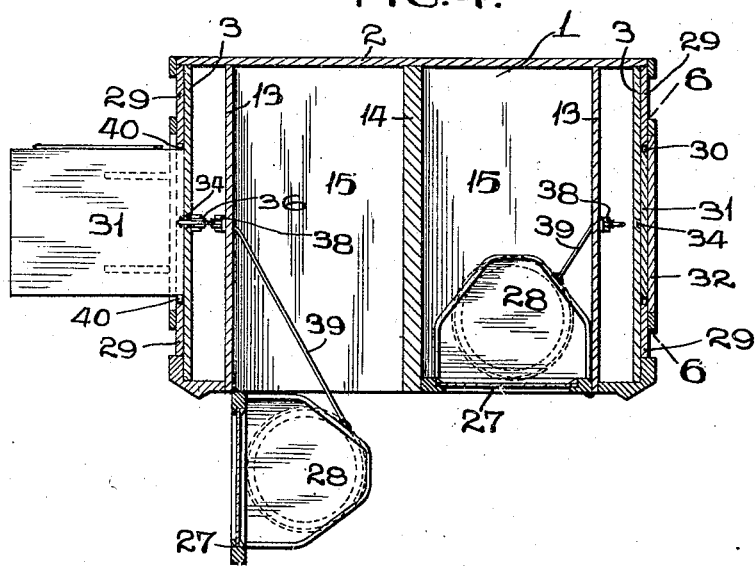
ATTEST.
H. J. Fletcher,
M. P. Smith
INVENTOR.
ALEXANDER R. STEPHENS.
By Higdon & Longan
ATT'YS.

No. 842,720. PATENTED JAN. 29, 1907.
A. R. STEPHENS.
KITCHEN CABINET.
APPLICATION FILED JULY 2, 1906.

3 SHEETS—SHEET 3.

ATTEST.
H. J. Fletcher.
M. P. Smith

INVENTOR.
ALEXANDER R. STEPHENS.
BY Higdon & Longan.
ATT'YS

UNITED STATES PATENT OFFICE.

ALEXANDER R. STEPHENS, OF JAMESTOWN, MISSOURI.

KITCHEN-CABINET.

No. 842,720.　　　　Specification of Letters Patent.　　　　Patented Jan. 29, 1907.

Application filed July 2, 1906. Serial No. 324,519.

*To all whom it may concern:*

Be it known that I, ALEXANDER R. STEPHENS, a citizen of the United States, and a resident of Jamestown, Moniteau county, Missouri, have invented certain new and useful Improvements in Kitchen-Cabinets, of which the following is a specification containing a full, clear, and exact description, reference being had to the accompanying drawings, forming a part hereof.

My invention relates to a kitchen-cabinet; and the object of my invention is to construct a simple cabinet for conveniently holding flour, meal, and similar commodities which are in daily use in a kitchen, and which cabinet is provided with a series of compartments or drawers for holding knives, forks, spoons, and similar kitchen utensils.

A further object of my invention is to provide means whereby the flour, meal, and the like are thoroughly sifted at the time they are discharged from their respective compartments.

A further object of my invention is to arrange a pair of dough-boards or shelves which are moved into horizontal positions at the ends of the cabinet when the doors in the front of said cabinet are opened to remove the receptacles containing the sifted flour or meal.

To the above purposes my invention consists in certain novel features of construction and arrangement of parts, which will be hereinafter more fully set forth, pointed out in the claims, and illustrated in the accompanying drawings, in which—

Figure 5:
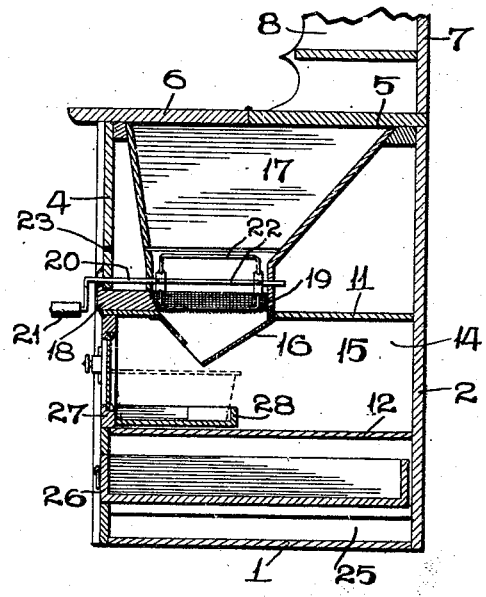
Figure 6:
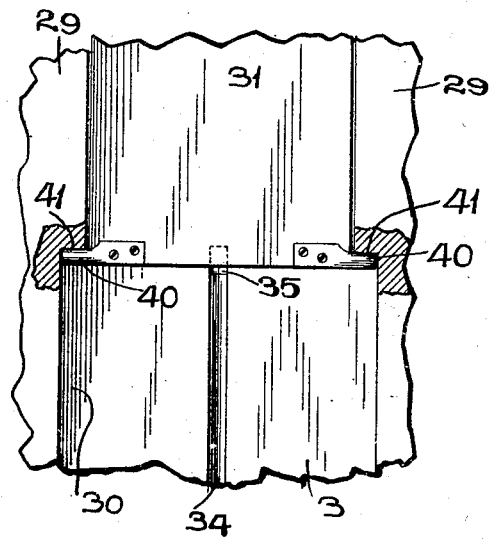
Figure 7:
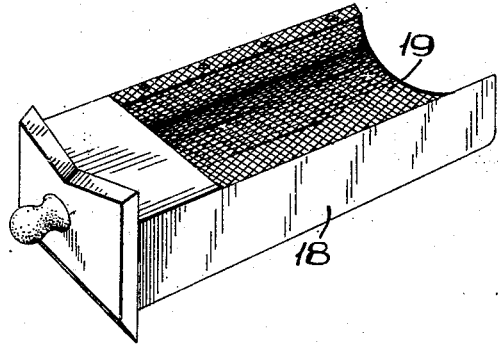

Figure 1 is a front elevation of a kitchen-cabinet of my improved construction. Fig. 2 is a side elevation of the cabinet. Fig. 3 is a vertical section taken on the line 3 3 of Fig. 2. Fig. 4 is a horizontal section taken on the line 4 4 of Fig. 3. Fig. 5 is a vertical section taken on the line 5 5 of Fig. 1. Fig. 6 is an enlarged detail section taken on the line 6 6 of Fig. 4 and showing the bearings of one of the dough-boards. Fig. 7 is a perspective view of one of the removable screen-sections used in connection with one of the sifting devices of my improved cabinet.

In the construction of my improved kitchen-cabinet the main body portion thereof is a rectangular structure comprising a base or bottom 1, rear wall 2, end walls 3, front wall 4, and top 5, the latter extending from the rear wall 2 to a point approximately one-half way between the rear wall and said front wall 4. Hinged to the front edge of this top 5 is a lid 6, which normally closes the space between the top 5 and the front wall 4.

Extending upwardly from the top of the body so formed is the rear wall 7 of a superstructure, and at the ends of said rear wall are located suitable end pieces 8, and arranged between the upper portions of said end pieces is a suitable housing 9, in which are located drawers and compartments 10, which are designed to receive knives, forks, spoons, and like kitchen utensils or baking-powder, spices, or similar commodities.

Located in the main body of the cabinet at a point midway between the bottom 1 and top 5 is a horizontally-disposed partition 11, and a similar partition 12 is located at a point approximately one-half way between said partition 11 and the bottom 1. The ends of these partitions 11 and 12 are united by end walls 13, which are arranged a short distance away from the inside faces of the end walls 3 of the cabinet, and a vertically-disposed centrally-arranged partition 14 divides the space between the partitions 11 and 12 into two uniform compartments 15. Leading downwardly into the forward portions of these compartments 15 are discharge-spouts 16, preferably constructed of sheet metal.

Located in the body of the cabinet between the partition 11 and top 5 are suitable hoppers 17, which are designed to receive flour, meal, or similar products, the lower ends of which hoppers communicate with the discharge-spouts 16. Arranged to slide through the front wall 4 immediately above the partition 11 and between each hopper 17 and its spout 16 is a frame 18, the rear portion of which carries a section 19 of reticulated material, such as fine wire mesh, and which reticulated section is curved in cross-section. When the sliding frames 18 are moved inwardly to their limit of movement, the reticulated sections 19 are arranged directly between the lower ends of the hoppers 17 and the spouts 16. Arranged for rotation in the lower end of each hopper 17 is a horizontally-disposed shaft 20, which extends outwardly through the front wall 4 of the cabinet, at which point it is provided with a crank-handle 21. Positioned on each shaft 20, in the lower end of the hopper 17, is a series of arms 22, which when the shaft 20 is rotated ride around upon the top surface of the corresponding reticulated section 19, thus performing the function of an ordinary rotary sifter. Formed through the front wall 4 immediately in front of one of the hoppers 17, which is intended to contain cornmeal, is a horizontally-disposed slot 23, which is adapted to receive a plate 24, which acts as a cut-off to prevent the body of the meal in this compartment from discharging through the sifter when it is desired to clean the latter or remove bran and coarse material from the sifting apparatus.

Beneath the partition 12 is a compartment 25, normally occupied by a drawer 26, which slides through the lower portion of the front wall 4 of the cabinet. Hinged doors 27 are arranged in the front wall 4 of the cabinet and normally close the front ends of the compartments 15, and carried by the lower portion of each door on the inside thereof is an inwardly-projecting shelf 28, the rear corners of which are cut away, and which shelf is designed to receive a pan or similar receptacle, into which the flour or cornmeal discharges from the spout 16 after passing through the corresponding sifting device.

Vertically disposed on the outside of each end wall 3 and at the front and rear portions thereof are the panels 29, between which are formed spaces 30, which are normally occupied by the sliding and swinging dough-boards 31. Extending across the lower portion of each pair of panels 29 is a rectangular panel 32, and fixed to the upper end of each of these panels 32 is a pair of outwardly-extending brackets 33.

Formed in the outer face of each end wall 3 is a vertically-disposed groove 34, and formed through each end wall at the upper end of each groove is an aperture 35, and there being a grooved pulley 36 located on the inside of each wall 3 adjacent each aperture 35. Formed through the lower portion of each end wall 13 of compartments 15 is an aperture 37, and located on the outer face of each end wall adjacent the aperture therein is a grooved pulley 38. A suitable flexible connection, such as a cord or chain, is secured to the rear end of each shelf 28 and extends from thence through the corresponding aperture 37, around the grooved pulley 38 adjacent thereto, and from thence upwardly over the corresponding grooved pulley 36, through the corresponding aperture 35, and from thence downwardly through the adjacent groove 34, and the lower end of said cord or flexible connection is secured to the lower end of the corresponding dough-board 31. Suitable journals 40 are secured to the lower corners of each dough-board 31, which journals are adapted to engage in suitable bearings 41, formed in the inner edges of the panels 29 in alinement with the top edges of the panels 32.

Formed through the end walls 3, adjacent the upper ends thereof and adjacent the inner edges of the rear pair of panels 29, are apertures 42, and located on the inner faces of the end walls 3 adjacent said apertures are the grooved pulleys 43. A suitable flexible connection 44, such as a chain or cable, is secured to the outer end of each dough-board 31 and extends from thence upwardly through the corresponding aperture 42, from thence around the adjacent pulley 43, and thence downwardly on the interior of the cabinet, and the lower end of each flexible connection is provided with a small counter-balancing-weight 45.

When the doors 27 are closed, the dough-boards 31 slide downwardly between the panels 29 behind the panels 32, and portions of the flexible connections 39 occupy the grooves 34. A supply of flour is located in one of the hoppers 17, and a supply of cornmeal or similar commodity is located in the hopper 17, through which the slide 24 is adapted to operate. The receptacles, such as mixing pans or bowls, which are to receive the flour or meal are kept in position on the shelves 28, carried by the doors 27.

When it is desired to use flour, the operator engages the crank-handle 21 of the sifting apparatus in front of the flour-compartment and rotates said crank-handle and in so doing moves the arms 22, carried by the shaft 20, rapidly over the reticulated section 19 beneath the flour-hopper, and as a result the flour is very quickly and thoroughly sifted through said reticulated section and discharged through the corresponding spout 16 into the pan or bowl located on the corresponding shelf 28. When the proper amount of flour has been delivered into the pan, which amount can be noted through the glass in the front of the corresponding door 27, the operator opens said door and swings the same outwardly to the position seen in Fig. 4, when the pan or receptacle may be readily removed from the shelf 28. This opening of the door draws the corresponding flexible connection 39 outwardly, and as a result the end of said flexible connection, which is attached to the corresponding dough-board 31, is drawn upwardly, and thus said dough-board is elevated between the panels 29 until the journals 40 engage in the bearings 41. When so elevated, said dough-board will swing downwardly into a horizontal position, as shown by dotted lines in Fig. 3, owing to the fact that said dough-board is slightly heavier than is its corresponding counter-balancing-weight 45, and thus the dough-board will automatically swing into an operative position, resting upon the brackets 33 when the corresponding door 27 is swung open. The operator now removes the pan or receptacle from the shelf 28 and places the same upon the dough-board, where it is in a convenient position to be handled. The opposite compartment, which is intended to contain cornmeal and the like, is provided with the sliding plate 24, which may be inserted through the slot 23 whenever desired in order to cut off the supply of meal from the sifting apparatus when a considerable amount of bran or coarse material has been deposited on the reticulated section 19 in order that the frame 18 containing said reticulated section may be withdrawn to remove said coarse material.

Both of the frames 18 are made removable in order that the reticulated sections thereof may be cleaned whenever desired.

A kitchen-cabinet of my improved construction is simple and inexpensive, very conveniently holds flour, meal, and similar commodities used in the kitchen, and the dough-boards are readily brought into position when the doors are opened to remove the sifted flour or meal.

It will be readily understood how the dough-boards will move into their out-of-the-way positions when the doors 27 are closed.

I claim—

1. A kitchen-cabinet, constructed with an inclosed body portion, a hopper arranged in said body portion, a sifting device arranged in the lower end of the hopper, a door normally closing the compartment below the sifting device, a shelf carried by said door, a sliding dough-board arranged in the side of the body, and connections between said dough-board and the shelf whereby said dough-board is moved into a horizontal position whenever the door carrying the shelf is opened; substantially as specified.

2. A kitchen-cabinet, constructed with an inclosed body portion, hoppers arranged in said body, movable dough-boards arranged on the sides of the body, doors normally closing the compartment below the hoppers, and connections between the doors and the dough-boards whereby the latter are moved into operative position when the doors are opened; substantially as specified.

3. A kitchen-cabinet, constructed with an inclosed body portion, movable dough-boards arranged on the sides of said body portion, doors normally closing a compartment in the lower portion of the body, and connections between the doors and the dough-boards whereby the latter are moved into operative position when the doors are opened; substantially as specified.

In testimony whereof I have signed my name to this specification in presence of two subscribing witnesses.

ALEXANDER R. STEPHENS.

Witnesses:
A. B. MEYER,
ALBERT HERNDON.